Jan. 24, 1956   R. J. WOLLERSHEIM   2,731,777
APPARATUS AND PROCESS FOR MOLDING POWDER PUFFS
Filed July 5, 1951   3 Sheets-Sheet 1
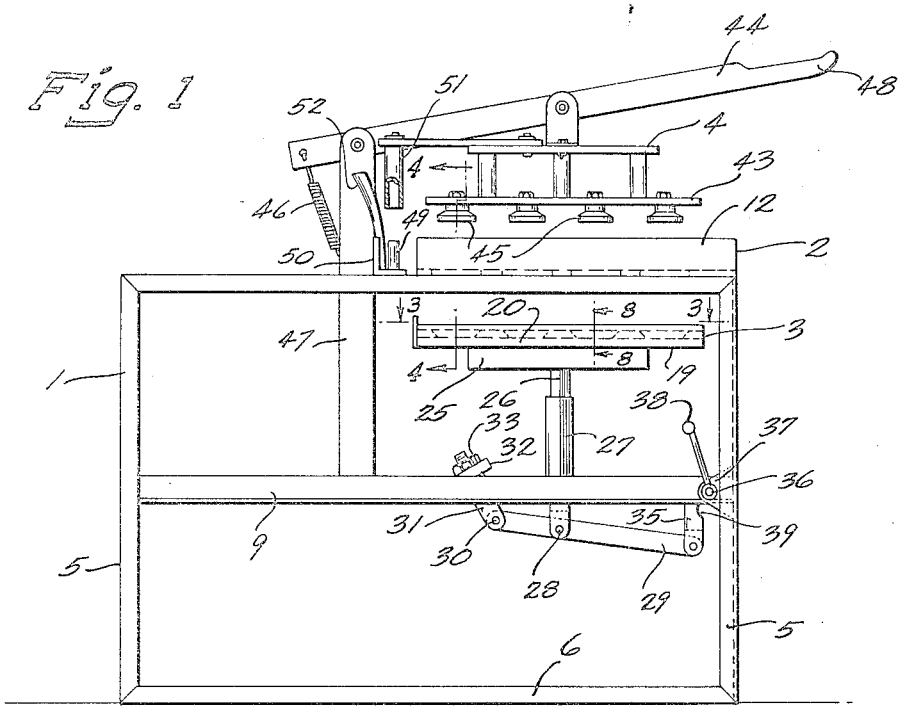
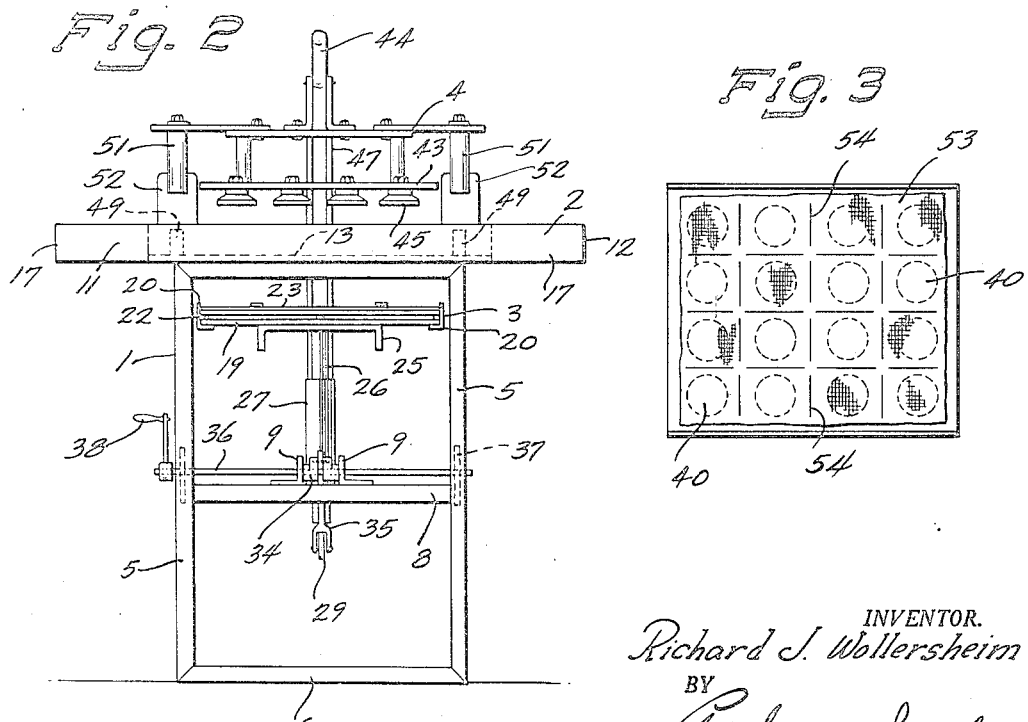
INVENTOR.
Richard J. Wollersheim
BY
Andrus & Sceales
Attorneys

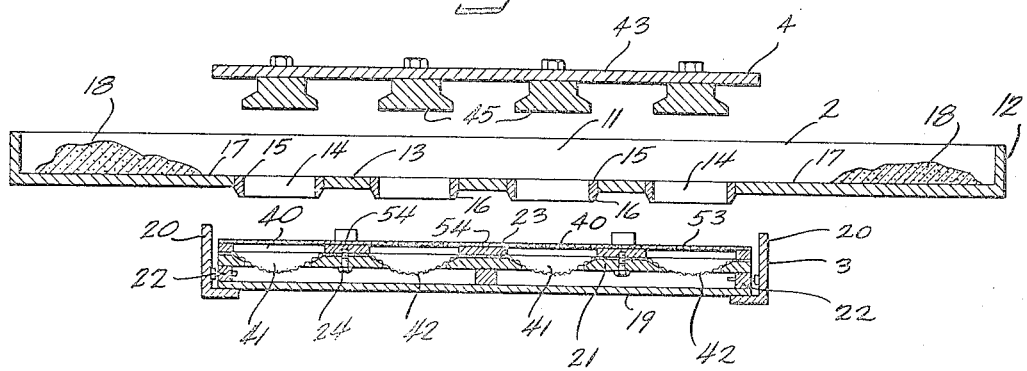
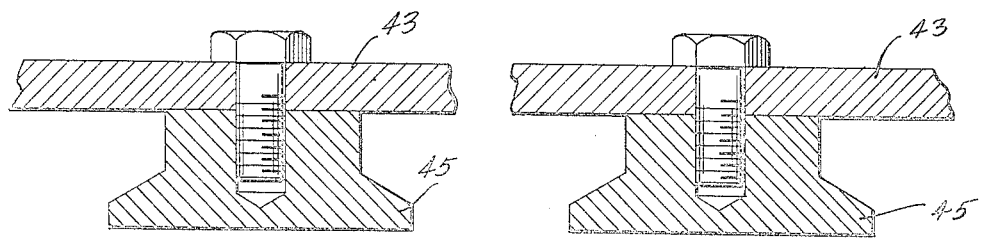
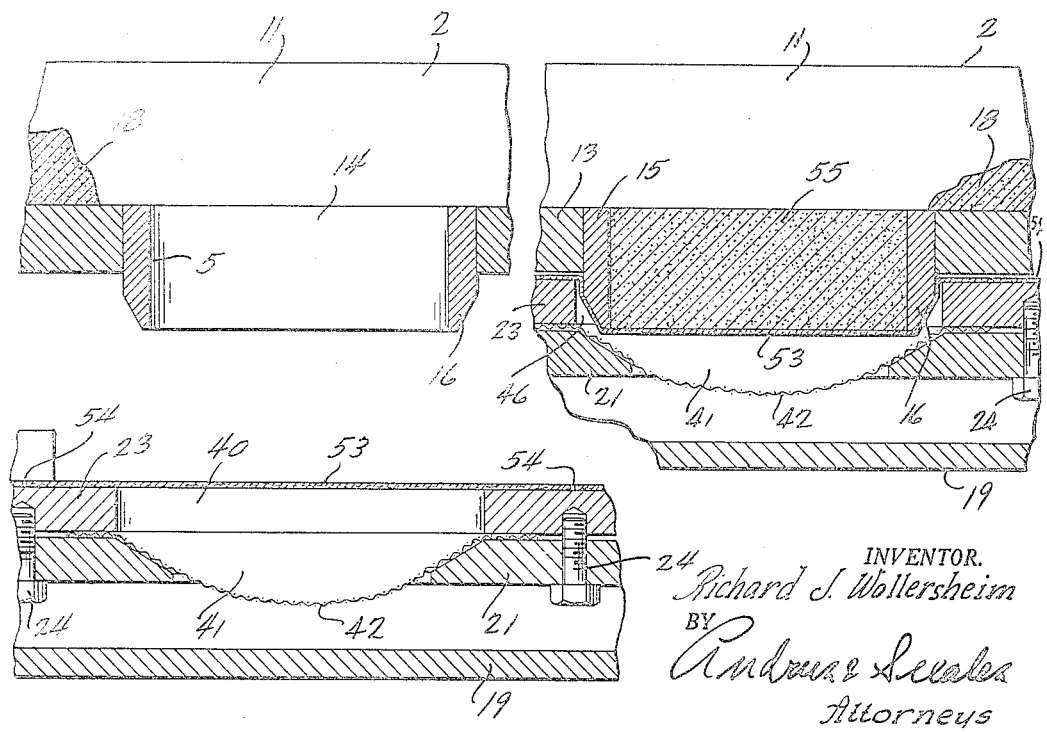

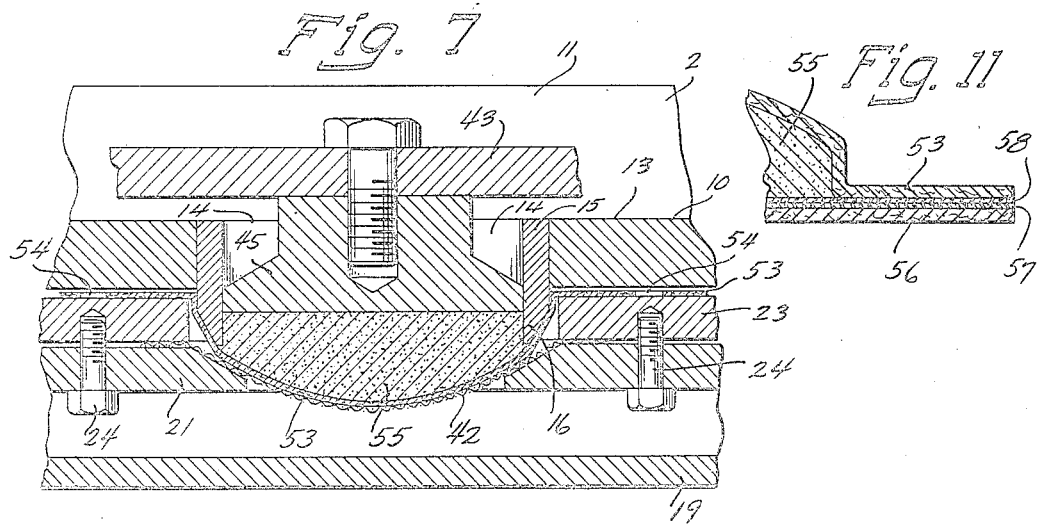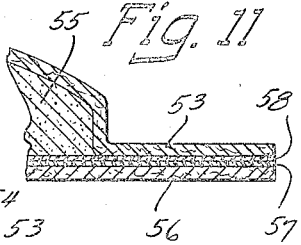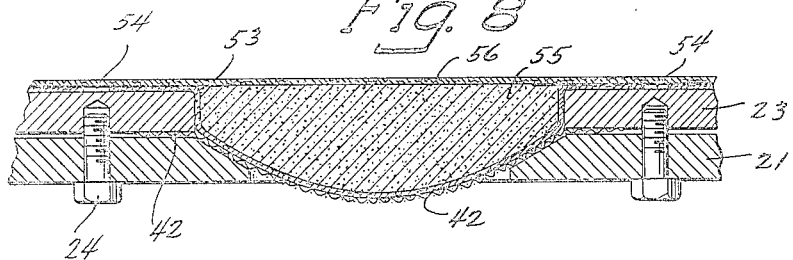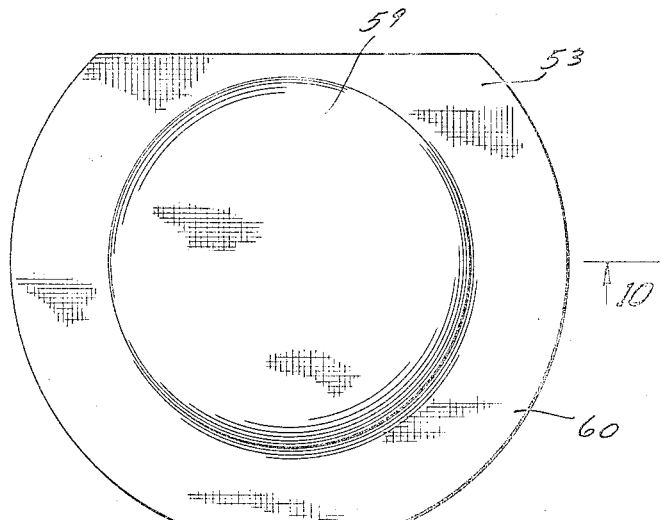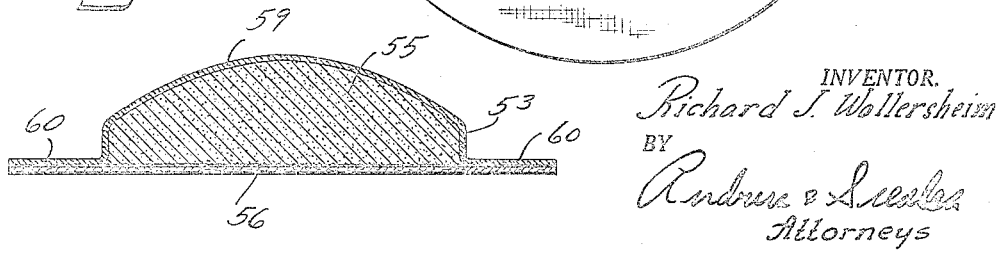

United States Patent Office 2,731,777
Patented Jan. 24, 1956

2,731,777

APPARATUS AND PROCESS FOR MOLDING POWDER PUFFS

Richard J. Wollersheim, Milwaukee, Wis., assignor to Kolmar Laboratories, Inc., Milwaukee, Wis., a corporation of Delaware Application July 5, 1951, Serial No. 235,173

7 Claims. (Cl. 53—11)

The present invention relates to the manufacture of powder puffs and more particularly to an improvement in the apparatus and method of fabricating a dispensing puff or envelope which contains the powder-like material.

The present invention is directed to a method of fabricating powder dispensing puffs from a facing sheet of powder-porous fabric and a backing sheet of impervious material utilizing essentially the following basic steps: The formation of indentations or pockets in the sheet of porous fabric; the depositing therein of a measured quantity of powder; the compressing of said powder; the overlaying of the impervious material; the bonding of the two sheets together; and the cutting of the bonded sheets around the pockets to release individual powder-filled envelopes.

Heretofore substantial difficulty has been encountered in forming the pockets and compressing the powder therein without a subsequent distortion of the pocket or injury to the fabric. Clamping the fabric at the peripheral edge of the pocket to prevent slippage during filling and compressing operations has resulted in an injury to the fabric at the clamped portion. In addition, compressing the powder into the clamped pocket brought about a stretching of the fabric and a subsequently distorted envelope or puff.

An object of the present invention is to provide a method of fabricating a powder-containing puff whereby the puff pocket is supported during molding in a manner to permit the air entrapped in the powder to escape during the compression of the powder in the mold.

Another object of the invention is to provide an apparatus for producing powder dispensing puffs which eliminates the necessity of clamping the fabric at the periphery of the pocket and the resulting injury to the puff fabric at the clamped portion.

Another object is to provide a method of producing a plurality of powder-containing puffs from a dispensing sheet of powder-porous material and a backing sheet of impervious material whereby the dispensing sheet is slit intermediate the puff pockets to permit expansion of the pockets without stretching and distortion of the dispensing sheet.

The present invention provides a novel procedure of fabricating such powder-filled pockets which eliminates the necessity of clamping the fabric sheet at the peripheral edge of the pockets. By this invention the fabric sheet is slit intermediate the pockets and the unclamped pockets are deepened during the powder-compressing operation and brought into contact with concave wire screens which support the deepened pockets and prevent the same from slipping or elongating during further compression of the powder. The slits intermediate the pocket areas free the fabric sheet for expansion in deepening of the pockets.

The air which is contained within the loosely packed powder, escapes during compression through the porous pocket and hence through the supporting screen to the atmosphere, thus eliminating the danger of the compressed powder being drawn upwardly by suction when the compressing means is withdrawn from the pocket.

Another problem which has arisen in former practice where the pocket is formed of velvet and the backing sheet is formed of velour, or the like, lies in the distortion of the pile of the velvet immediately adjacent the pocket during gluing of the margin. Where sufficient glue is employed to compensate for absorption by the velour upon which it is initially applied there is a substantial absorption of the glue by the velvet tending to cause damage to the stand of the pile during gluing. A good pile stand may be obtained at a sacrifice of the pile immediately adjacent the pocket by employing a higher pressure for setting the glue in the zone adjacent the pocket, with a lighter quantity of glue.

The present invention avoids damage to the pile and improves the appearance of the puff by first making the velour impervious to the glue and then employing a lighter coat during the assembly of the puff.

Other objects and advantages will appear in the accompanying description of an embodiment of the invention.

In the drawings:

Figure 1 is a side elevation of the pocket forming and filling apparatus;

Fig. 2 is a front elevation of the same apparatus;

Fig. 3 is a plan view taken along line 3—3 of Fig. 1 showing the facing sheet disposed on the die unit;

Fig. 4 is a vertical section taken along line 4—4 of Fig. 1 showing the relation of the stationary tray to the die unit and plunger means;

Fig. 5 is an enlarged fragmentary view of Fig. 4 showing the aligned relation of the plunger, cylinder and recess;

Fig. 6 is a view similar to Fig. 5 illustrating the elevating of the die recess toward the cylinder;

Fig. 7 is a view similar to Fig. 6 showing the powder being compressed in the cylinder by the plunger;

Fig. 8 is a fragmentary sectional view taken along line 8—8 after the backing sheet is overlaid on the powder-filled pocket;

Fig. 9 is a plan view of the completed powder-containing envelope;

Fig. 10 is a sectional view taken along line 10—10 of Fig. 9; and,

Fig. 11 is an enlarged fragmentary view of Fig. 10.

As shown in the drawings, the apparatus comprises generally a frame 1 on which is mounted a fixed tray 2, a vertically movable die unit 3 disposed beneath the tray, and a vertically movable plunger and pressure assembly 4 disposed above the tray.

The frame 1 may be of any suitable table-like structure, that shown, being constructed of angle iron and having vertically disposed corner legs 5 joined at the lower ends thereof by horizontally disposed side and end rails 6 and at the upper ends thereof by similar horizontally disposed side and end rails 7.

A pair of horizontal end braces 8 extend between the mid-portions of adjacent legs 5 and support a pair of longitudinally extending angle irons 9 disposed in closely spaced back-to-back relation for carrying operating mechanism to be described hereinafter.

The stationary tray 2 is generally rectangular and is supported upon the rails 7 with the ends of the tray overhanging the sides of the frame 1 for a substantial distance. The tray 2 has a flat bottom 10 with upstanding front and rear walls 11 and end walls 12.

That portion 13 of tray bottom 10 disposed between side rails 7 is provided with a plurality of spaced annular openings 14 of a diameter corresponding generally with the puffs to be made. Each opening 14 has a vertically disposed cylindrical member 15 secured therein with the upper end of member 15 flush with the top surface of plate 10 and the lower end of member 15 extending downwardly to form a circular flange 16 about the corresponding opening 14.

The overhanging end portions 17 of tray 2 are free from openings 14 and serve as storage space for powder 18 to be used in filling puffs, as hereinafter described.

The die unit 3 comprises a rectangular base 19 having upstanding side flanges 20 shown in the form of angle irons secured to the side edges thereof. The base 19 supports a lower die plate 21 spaced above the same by suitable spacer strips 22 which are secured to the underside of plate 21. An upper die plate 23 is supported by plate 21 and is secured thereon by bolts 24 extending upwardly through apertures in the central portion of plate 21 and threaded into plate 23. The heads of bolts 24 are disposed in the space between base 19 and the lower die plate 21.

The die unit 3 is suitably supported for vertical movement by a lifting mechanism illustrated as comprising an inverted channel member 25 secured to the underside of the center of base 19 and mounted on the upper end of a vertically disposed rod 26. The rod 26 is vertically movable in a guide bearing or housing 27 secured upon the longitudinally extending angle irons 9, and is supported by means of a pin 28 pivotally securing the lower end of the rod to a cross lever 29.

Lever 29 is disposed generally longitudinally of frame 1 beneath angle irons 9 and has a fulcrum at its rear end provided by a pin 30 pivotally securing the same to a link 31 depending from the angle irons 9. For the purpose of adjusting the position of the fulcrum for lever 29 the link 31 is constructed with a cylindrical upper end extending through a bracket 32 pivotally carried by angle irons 9 and a nut 33 is threaded upon the upper end of the link to support it in the bracket.

The forward end of lever 29 is vertically movable and is suspended from a crank 34 by means of a link 35. Crank 34 is carried by a shaft 36 mounted for rotation in brackets 37 on the front legs 5. Shaft 36 is actuated by means of a hand crank 38 at one end thereof.

When the die unit 3 is in its lowermost position the front end of lever 29 is suspended by link 35 with crank 34 disposed downwardly from shaft 36. When the die unit 3 is raised to a position adjacent the bottom of tray 2 the crank 34 extends upwardly from shaft 36 and just passes dead center relative to link 35 so that the die unit is maintained in this position until released by manual operation of crank 38. The dead center stop position for crank 34 is determined by a recess 39 in the forward edge of link 35 adapted to receive shaft 36 and to engage the same.

The upper die plate 23 has a plurality of openings 40 therein disposed to register with and to receive the corresponding flanges 16 extending downwardly from the tray bottom 10, as shown in Fig. 7.

The lower die plate 21 has a plurality of openings 41 therein of smaller diameter than openings 40 and registering with the corresponding openings 40. The upper surface of die plate 21 is beveled around each opening.

A screen 42 or other perforate plate is clamped between plates 21 and 23 and extends across each corresponding opening 41 in a concave shape forming with corresponding opening 40 a pocket-like recess for receiving a puff to be filled, as will be described later. For this purpose each screen 42 is supported by the beveled surface of plate 21 surrounding the corresponding opening 41.

The pressure assembly 4 comprises a horizontally disposed plate 43 suspended from a lever arm 44 and carrying a plurality of die plungers 45 adapted to register with and to enter the upper ends of the corresponding cylindrical members 15 secured in tray bottom 10. When in raised position the plate 43 and its plungers 45 are substantially spaced above tray 2 so as to enable manual filling of the puffs. Suitable counterweight or spring means 46 may be employed to normally retain plate 43 in its uppermost position to thereby free the hands of the operator from lever 44.

The lever 44 is pivotally fulcrumed at its rear end upon an upstanding post 47 supported by angle irons 9. The lever 44 extends forwardly from its fulcrum to provide a handle 48 disposed in a suitable location for manual lowering of plate 43 and its plungers 45 under a substantial force.

The plate 43 is guided to center plungers 45 with their respective puff-forming pockets beneath corresponding cylindrical members 15, by means of suitable pins 49 extending upwardly from a cross member 50 on post 47, and corresponding sockets 51 extending downwardly in alignment with the pins from a rearward extension of the suspension for plate 43. Additional curved guides 52 extend upwardly from cross member 50 adjacent pins 49 to guide sockets 51 onto the pins as lever arm 44 is lowered.

In operating the apparatus and carrying out the process the ends of tray 2 are normally kept reasonably full of powder 18 for filling the puffs.

A pocket-forming slit sheet of velvet 53 with the nap or pile facing downwardly is laid upon the top of upper die plate 23, as shown in Figs. 4 and 5. The velvet sheet 53 is slit along lines 54 intermediate the position of the puffs to be formed, as shown in Fig. 3, whereby, when the movable die unit 3 is raised to its uppermost position near to the bottom of tray 2 and circular flanges 16 engage the sheet 53 and force it downwardly into openings 40 and out of the plane of the sheet, the slits provide for the necessary expansion of the velvet and prevent stretching of the same and possible damage thereto.

After raising of die unit 3 and semi-formation of the pockets depending from sheet 53 by means of flanges 16, the several cylindrical members 15 are each filled with a charge of powder 55 by manual manipulation of a suitable scraper, not shown, in tray 2 to scrape powder 18 from the ends of the tray across the central perforate section 13 and into the members 15, filling the latter, as shown in Fig. 6.

The next operation is to push the handle 48 of lever arm 44 downwardly, thereby causing plungers 45 to enter the corresponding cylindrical members 15 and compress the powder charge 55 therein downwardly, as shown in Fig. 7, until the pocket sections of velvet sheet 53 are expanded downwardly into contact with supporting screen 42. The porous nature of screen 42 and of velvet 53 provides for the escape of air downwardly from the powder as the powder is compressed and the pockets are finally shaped.

The crank 38 may be then flipped to drop the movable die unit 3 away from tray 10, while downward force is maintained upon lever 44 and its plungers 45, whereby the lower tapered ends of flanges 16 are withdrawn from the puff pockets and the latter filled out radially to the edge of the corresponding openings 40 in plate 23.

When plungers 45 are separated from the powder charges 55, and withdrawn upwardly by raising of lever 44, the upper surface of the powder charge in each pocket will drop a little at the edges in expanding of the powder radially outward to complete the filling of the space left by withdrawal of the corresponding flanges 16. This fact avoids danger of spilling of powder over the top surface of the velvet sheet 53 around the pockets, and insures a clean surface for gluing of a backing sheet 56 to sheet 53.

The backing sheet 56 is preferably of a tightly woven velour or other suitable substantially powder-impervious material. It is treated on one side first by a coating 57 of suitable plastic material such as plasticized pale glycerol ester of rosin emulsified in water.

Before applying the backing sheet 56 to sheet 53, a thin coating 58 of glue, such as a rubber latex cement, is applied over the plastic coating 57.

For the purpose of applying backing sheet 56, the die plates 21 and 23 are removed from base 19 and side flanges 20 and may be placed in the tray 10 beneath the pressure assembly 4. The backing sheet 56 with the glue coat 58 downward, is then placed on top of the velvet sheet 53. A suitable rigid pressure plate, not shown, may then be applied over sheet 56 and lever 44 lowered to cause plungers 45 to engage the pressure plate and suitably press the sheet 56 onto sheet 53 to bond the same with the glue 58.

Where it is desired to provide a line production, it is possible to place the die plates 21 and 23 loaded with the powder filled pockets of velvet upon a suitable flat table top and to then apply the backing sheet 56 and bond the same by a suitable roller or other means of applying pressure thereto.

The bonded sheets 53 and 56 with the powder filled pockets therebetween are then removed from die plates 21 and 23 and are cut along lines intermediate the pockets to release the individual puffs.

The completed puffs preferably have the shape indicated in Figures 9 and 10 wherein the central portion constitutes a pillow-like circular powder container 59 and the flat marginal portion constitutes a soft pliable spreader 60 which serves also for manual gripping of the puff. A portion of the margin of spreader 60 may be cut away, as shown in Fig. 9, to facilitate removal of the puff from a circular container.

By utilizing the initial plastic coating 57 on the backing sheet 56, it is possible to reduce the amount of cement necessary to bond the sheets 53 and 56 together, thereby overcoming the problem of undesirable cementing of the velvet pile in a flat condition. The pile of the velvet stands up evenly throughout the flange or bonded area of the puff.

In treating the velour backing sheet 56 with the pore closing plastic, the latter is dried before application of the rubber cement, thereby closing the pores to the cement and substantially reducing the quantity of cement required.

The envelopes formed are of uniform size and the velvet pile is not flattened by undue penetration of the cement or by clamping of the velvet around the pockets during forming of the envelopes. The slits 54 provide freedom of expansion of sheet 53 so that the velvet can be formed downwardly into the pocket molds provided by die plates 21 and 23 and by the screens 42 without distortion of the fabric. In this regard clearances are provided between upper die plate 23 and the bottom 10 of tray 2 and the cylindrical members 15 so that the velvet is not clamped at any location and is free to take the shape of the pocket and of screen 42.

Upper and lower die plates 21 and 23, respectively, are secured together by screws 24 and constitute a die unit that is removable from base 19 and its side flanges 20 for application of the velvet sheet 53 and for subsequent application of the velour sheet 56. The die unit has adjustable stop members locating the same on base holder 19 during the filling and compressing operations previously described.

Various apparatus and procedures may be employed within the scope of the invention.

I claim:

1. In an apparatus for forming envelopes of cosmetic powder in the making of powder puffs having a powder-porous fabric face, a die comprising a die plate with a plurality of spaced recesses therein of the size and shape of one side of the envelopes to be formed, porous means at the bottom of each recess, means for supporting and positioning the porous means to support a porous fabric and to provide for the escape of air from a charge of powder as the latter is compressed upon the fabric, and a pressure mechanism comprising a plurality of spaced plungers disposed in alignment with said recesses and adapted to compress a charge of powder into each pocket formed in the fabric in the corresponding recesses of said die plate.

2. In an apparatus for forming envelopes of cosmetic power in the making of powder-containing powder puffs having a powder-porous fabric face, a die comprising a die plate having a plurality of spaced recesses therein of the size and shape of one side of the envelopes to be formed, said die plate being adapted to receive a porous fabric sheet laid thereon with the fabric sheet slit along lines intermediate the recesses, means to force spaced areas of the sheet into corresponding recesses of said die plate with the sheet being expanded at the slits to form pockets between the slits for the reception of corresponding charges of powder, porous means at the bottom of each recess, means for supporting and positioning the porous means to support the fabric during compressing of a charge of powder to provide for the escape of air from the charge of powder as the latter is compressed upon the fabric, and means to compress the powder charges in said pockets from above thereby forcing the fabric to the shape of the recess and of said porous support.

3. In an apparatus for forming powder-filled envelopes in the construction of powder puffs, a die having a recess in its upper surface of the general size and shape of one side of the envelope and adapted to receive thereon a porous fabric for constituting the face of the envelope, a porous generally concave bottom for said recess constituting means to support the fabric and provide for the escape of air from a charge of powder during final compressing of the charge in the recess, a tubular member disposed to enter said recess and to initially form the fabric into a pocket for the reception of a charge of powder, a plunger disposed to enter said tubular member and to compress a charge of powder downwardly to form the fabric against said porous bottom support and shape the same to the recess, and means to provide a clearance between said tubular member and the edge of said recess when said tubular member is disposed within the recess to permit freedom of movement of the fabric within the clearance during downward forming of the fabric.

4. The method of constructing a powder-filled powder puff, comprising providing a die having a recess of the shape of the envelope portion of the puff and having a porous bottom for the escape of air therethrough, laying a powder-porous fabric upon the die and forcing the central part thereof downwardly into the die recess to form an initial pocket for the reception of a charge of powder, filling the pocket with a charge of powder, supporting the pocket on the porous die bottom while maintaining the marginal portion of the pocket at the edges of the die recess free of clamping forces to permit freedom of movement of the fabric, pressing the powder downwardly to force the fabric into final shape against said porous die bottom while permitting air to escape through the die bottom as the powder becomes compressed, and thereafter applying a backing sheet for the puff to said fabric and over said charge of powder.

5. The method of constructing a powder-filled powder puff having a powder-porous velvet facing and a non-porous velour backing and having a substantially flat margin surrounding an envelope containing powder, comprising forming the face of the envelope from a flat sheet of velvet into pocket shape and filling the same with a charge of powder, compressing the powder in the pocket while supporting the velvet directly throughout the area of the same to prevent strain and distortion, applying an initial pore-filling coating to a sheet of velour, thereafter applying a thin fresh coating of cement to the velour, and then bonding the velour as a backing over the powder charge and to the marginal areas of said velvet around the pocket to complete the envelope, the initial filling of said velour substantially eliminating the requirement of a heavy coating of cement that might tend to injure the nap of the velvet in the cemented region.

6. The method of constructing a powder-filled powder puff having a powder-porous velvet facing and a nonporous velour backing and having a substantially flat margin surrounding an envelope containing powder, comprising forming the face of the envelope from a flat sheet of velvet into pocket shape and filling the same with a charge of powder, applying an initial pore-filling coating to a sheet of velour, thereafter applying a thin fresh coating of cement to the velour, and then bonding the velour as a backing over the powder charge and to the marginal areas of said velvet around the pocket to complete the envelope, the initial filling of said velour substantially eliminating the requirement of a heavy coating of cement that might tend to injure the nap of the velvet in the cemented region.

7. The method of constructing powder-filled puffs, comprising providing a die having a series of adjacent recesses each of the shape of an envelope portion of the puff to be formed therein and having a porous bottom for the escape of air therethrough, laying a powder-pervious fabric upon the die with the fabric slit along lines intermediate the adjacent recesses, forcing the fabric disposed centrally over each recess downwardly into the corresponding recess while expanding the fabric at the slits to form initial pockets in the recesses for the reception of powder charges, filling each pocket with a charge of powder, pressing the powder in the several pockets downwardly to force the fabric into final shape against the porous die bottom while permitting air to escape through the die bottom as the powder becomes compressed, thereafter applying a backing sheet for the puffs to confine the compressed powder charges within the pockets, and then separating the envelope pockets.

References Cited in the file of this patent
UNITED STATES PATENTS

| | | |
|---|---|---|
| 2,251,243 | Randall | July 29, 1941 |
| 2,365,920 | Vaughn | Dec. 26, 1944 |
| 2,452,935 | Kemp | Nov. 2, 1948 |
| 2,573,141 | Heinrich | Oct. 30, 1951 |